Dec. 7, 1971  E. RUTKOVE  3,625,089
GRAVITY WHEEL APPARATUS
Filed April 30, 1970  2 Sheets-Sheet 1
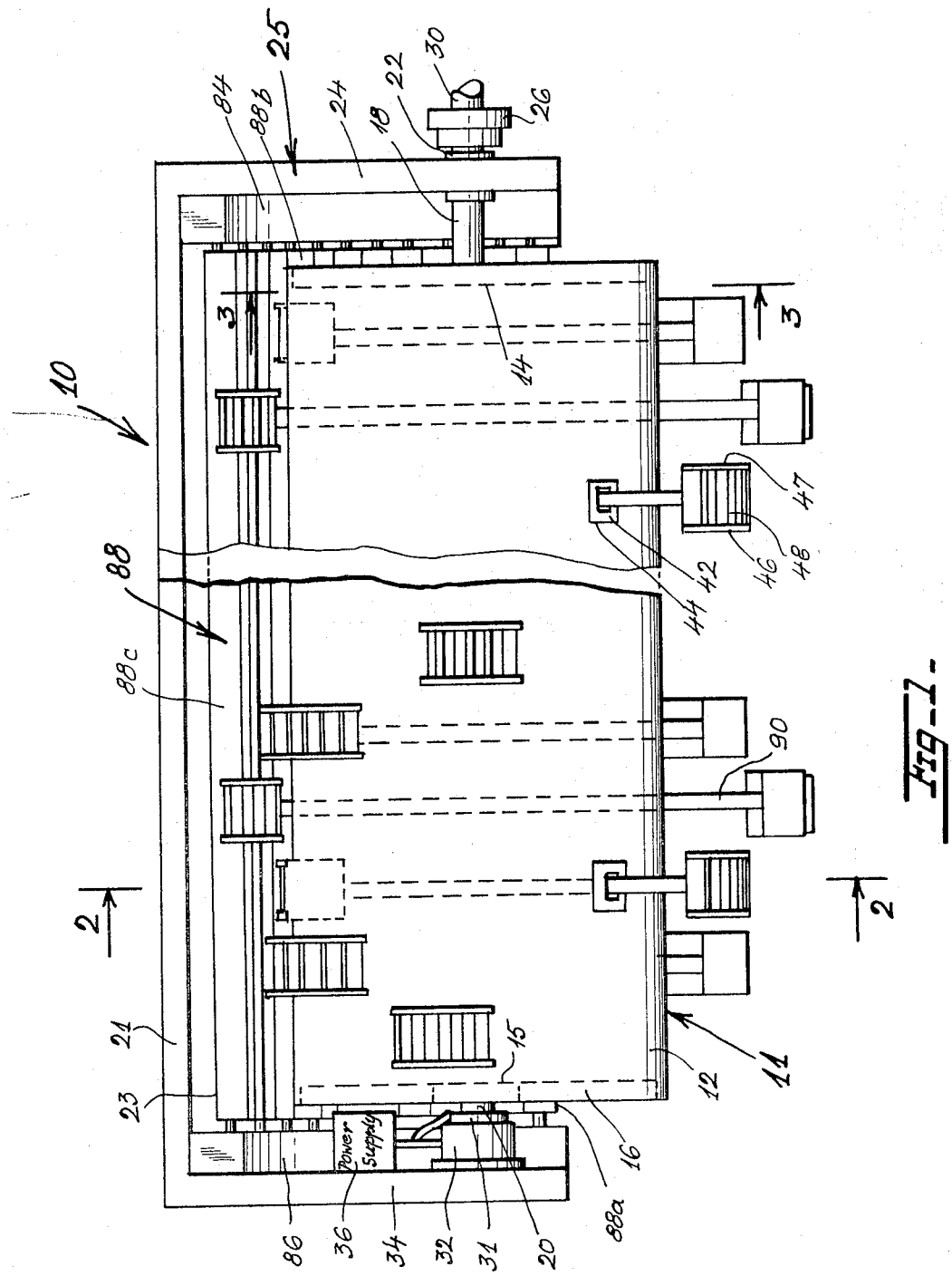
INVENTOR.
EDWARD RUTKOVE
BY
Polachek & Saulsbury
ATTORNEYS

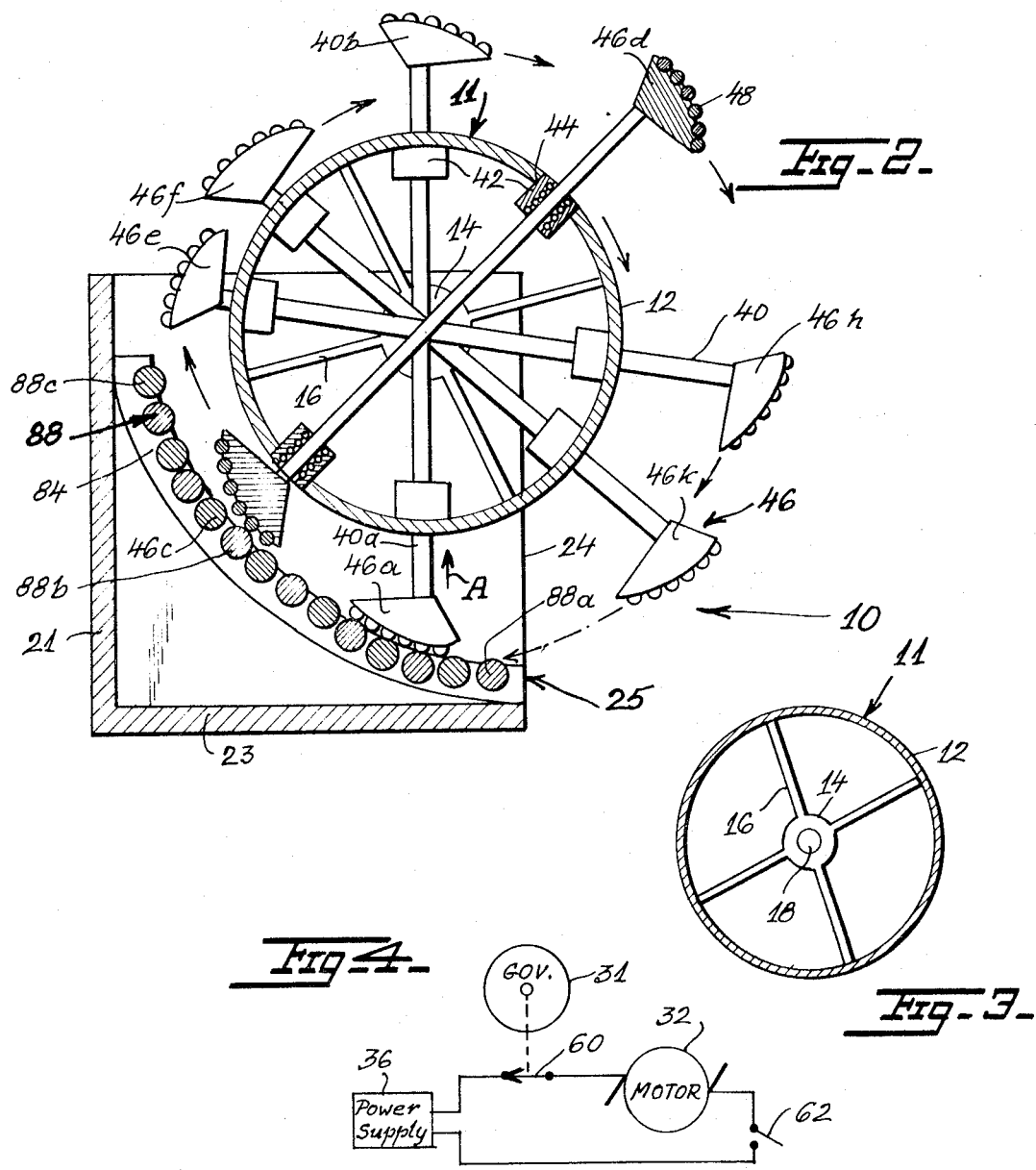

United States Patent Office 3,625,089
Patented Dec. 7, 1971

3,625,089
GRAVITY WHEEL APPARATUS
Edward Rutkove, 601B Surf Ave.,
Brooklyn, N.Y. 11224
Filed Apr. 30, 1970, Ser. No. 33,342
Int. Cl. H02k 7/02
U.S. Cl. 74—572                               10 Claims

ABSTRACT OF THE DISCLOSURE

A rotary gravity wheel apparatus includes an axially horizontal cylinder carried by a support. A plurality of spokes extend diametrally of the cylinder in axially and circumferentially spaced array. Weighted shoes are mounted on opposite ends of the spokes. An inclined platform under the cylinder causes the spokes to move axially diametrally of the cylinder and raise upper shoes while lower showes ride on the platform. Roller bearings on the shoes and platform minimize friction. A governor controlled motor overcomes inertia of the cylinder when starting.

This invention relates to gravity operated or assisted machines for supplying power, as for example for the purpose of rotating a shaft with the shaft in turn driving any of various devices including generators, display devices, toys, etc.

In my prior Pat. 2,850,261, I have described a water wheel apparatus which operates in a body of moving water. The present invention concerns rotary apparatus of similar character which operates gravitationally on land.

According to the invention a rotary cylindrical wheel has a central axial shaft. The wheel carries a multiplicity of diametrally disposed movable spokes. Weighted shoes are secured on opposite ends of the spokes. An electric motor is coupled to the shaft via a slip clutch. The spokes are spaced apart axially along the wheel and are also circumferentially spaced apart. An inclined platform is provided for elevating the spokes. When the spokes are fully elevated they are overbalanced and turn gravitationally. This turns the wheel at high speed and drives the central shaft which has an extension for coupling to a rotary load. As many as thirty-two or more weighted spokes can be provided to insure uniform rotational motion of the wheel. Roller bearings are provided in the inclined platform and in the weighted shoes at the ends of the spokes. Ball or roller bearings are further provided to facilitate axial sliding of the spokes.

Other and further features, objects and advantages of the invention will become apparent from the following detailed description taken together with the drawings, wherein:

FIG. 1 is a top plan view of a gravity wheel apparatus embodying the invention.

FIG. 2 is a vertical cross sectional view taken on line 2—2 of FIG. 1.

FIG. 3 is a reduced cross sectional view taken on line 3—3 of FIG. 1.

FIG. 4 is a diagram of the electrical circuitry of the apparatus.

Referring first to FIGS. 1, 2 and 3 of the drawings there is shown apparatus 10 comprising an axially horizontal hollow rotary cylindrical wheel 11 comprising cylinder 12. At opposite ends of the cylindrical wheel are spider rings 14, 15 having integral radial arms 16 connected to cylinder 12. Short shafts 18, 20 at opposite ends of the cylinder are secured to rings 14, 15 and extend axially outward. Shaft 18 is journaled to rotate in bearing 22 which is mounted in vertical end wall 24 of a support frame 25. A slip clutch 26 is coupled to shaft 18. Power takeoff shaft 30 is connected to clutch 26. Any suitable rotary load can be connected to shaft 30.

The other shaft 20 is connected via a speed governor 31 to a motor 32 mounted on opposite vertical end wall 34 of frame 25. A local power supply 36 such as a battery can be mounted on walls 34 along with the motor. Alternatively a remote power supply can be used.

A multiplicity of axially slidable spokes 40 extend diametrally through the cylinder. The spokes extend through ball bearing rings 42 set in holes 44 in the cylinder at diametrically opposite points. At opposite ends of each spoke are massive weighted shoes 46. The shoes have curved outer sides formed with flanges 47 between which are rotatable roller bearings 50.

Secured to end walls 24 and 34 of frame 25 are curved rails 84, 86 carrying axially horizontal rotatable bearing rollers 88. The bearing rollers are arranged so as to define a curved upwardly inclined platform in the direction of rotation of cylinder 12 as indicated by the arrows in FIG. 2. The rollers at the lower right end of the platform as shown in FIG. 2 are under the cylinder and are further spaced from the axis of the cylinder than the upper rollers at the left end of the platform. From the first roller 88a to center roller 88b midway up the platform the radial distance from the axis of the cylinder progressively decreases. From roller 88b to top roller 88c the rollers are all equally distant radially from the axis of the cylinder. End walls 24, 34 of the frame are joined by side wall 21. Walls 21, 24 and 34 are joined to base 23.

FIG. 4 shows part of the electrical circuitry of the apparatus. Power supply 36 is connected to motor 32 in series with switch 60 controlled by governor 31. Another switch 62 is provided for manually closing the circuit to start the motor.

In operation of the apparatus, the cylindrical wheel 11 rotates continuously. Motor 32 starts rotation when switch 62 is closed. Then the weighted spokes start reciprocating axially. As the lowermost shoe 46a shown in FIG. 2 reaches the first roller 88a its spoke 40a starts moving axially upward as indicated by arrow A. This elevates the other shoe 46b at the other end of spoke 40a. The spoke continues to slide up while shoe 46a rides along the platform to roller 88b. There the shoe reaches its closest position to the axis of the cylinder as indicated by shoe 46c. The opposite shoe 46d is now disposed to the right of the central vertical axial plane of the cylinder and its leverage is such as to pull the cylindrical wheel 11 clockwise. Shoe 46c and all other shoes 46e, 46f to the left of the central vertical plane of the cylinder remain close to the cylinder while their opposite shoes 46d, 46h, 46k are extend outwardly as far from the cylinder as possible. The weighted shoes on the extended spoke portions to the right of the central vertical plane of the cylinder keep overbalancing the shoes to the left of this plane and keep the cylindrical wheel 12 rotating at constant speed. Motor 32 operates when the apparatus is first started to overcome inertia and operates occasionally to overcome residual friction. When the speed of the cylindrical wheel 11 reaches or rises above a certain speed, the governor 31 cuts out the motor by opening switch 60. The governor cuts in the motor by closing switch 60 when the speed of the cylindrical wheel falls below a certain other speed. The shaft 18 and its extension 30 can drive any desired external rotary load. If an excess load is applied, clutch 26 clips to avoid stalling the cylindrical wheel.

The cylindrical wheel takes full advantage of the gravitational and centrifugal effects of the extended spoke portions and weighted shoes to rotate continuously at substantially constant speed. The roller and ball bearings minimize friction. An array of thirty-two or more spokes is preferred because this will insure uniform motion.

However more or less spokes can be provided if desired.

The apparatus can be used in a commercial installation to drive rotary loads of many types. It can be made in suitable sizes for advertising or optical display purposes in amusement parks, expositions, and the like. It can be made up in small sizes for use as a toy for entertainment purposes. It can be made up in suitable sizes for use as a classroom or laboratory educational exhibit. Other uses and applications for the apparatus will readily occur to those skilled in the art. Although a preferred embodiment has been described it will be understood that many variations and modifications are possible without departing from the invention.

What is claimed is:

1. Rotary apparatus, comprising a support; an axially horizontal rotatable cylinder carried by said support; a plurality of spokes extending diametrally through said cylinder, said spokes being spaced apart axially and circumferentially of the cylinder and being axially slidable diametrally of the cylinder: weighted shoes on opposite ends of the spokes; an inclined platform disposed under the cylinder for engagement by shoes of the spokes for moving the spokes axially of the cylinder to raise shoes on ends of extended portions of the spokes as the cylinder rotates; and motor means operatively arranged to turn the cylinder for overcoming inertia and friction.

2. Rotary apparatus as defined in claim 1, further comprising shafts extending axially outward of the cylinder; and stationary supports at opposite extending axially outward of the cylinder; said support comprising vertical members at opposite ends of the cylinder rotatably supporting said shafts, one of said shafts extending beyond said support for coupling a rotary load thereto.

3. Rotary apparatus as defined in claim 2, further comprising a slip clutch coupled to said one shaft to keep said wheel rotating in the event said one shaft is excessively loaded by said rotary load.

4. Rotary apparatus as defined in claim 3, further comprising a governor mounted on the other shaft; and a switch controlled by said governor and connected in circuit with the motor means for cutting out the motor when the rotary speed of the cylinder reaches a predetermined speed and for cutting in the motor when the rotary speed is below a certain other predetermined speed.

5. Rotary apparatus as defined in claim 4, wherein said inclined platform comprises a plurality of axially horizontal laterally spaced rollers carried by said support; and wherein said shoes carry roller bearings, so that friction is minimized when the shoes move over the inclined platform.

6. Rotary apparatus as defined in claim 2, further comprising ball bearing rings inserted in holes in the cylinder and contacting the spokes to minimize sliding friction of the spokes in the cylinder.

7. Rotary apparatus as defined in claim 1, wherein said inclined platform comprises a plurality of axially horizontal laterally spaced rollers for minimizing friction when the shoes contact the platform.

8. Rotary apparatus as defined in claim 1, further comprising a governor operated switch connected in circuit with the motor means for cutting out the motor when the rotary speed of the cylinder reaches a predetermined speed and for cutting in the motor when the rotary speed is below a certain other predetermined lower speed.

9. Rotary apparatus as defined in claim 1, wherein said shoes carry roller bearings to minimize friction when the shoes move over the inclined platform.

10. Rotary apparatus as defined in claim 9, wherein said inclined platform comprises a plurality of axially horizontal laterally spaced rollers carried by said support; and wherein said shoes carry roller bearings, so that friction is minimized when the shoes move over the inclined platform.

References Cited

UNITED STATES PATENTS

| | | | |
|---|---|---|---|
| 1,935,980 | 11/1933 | Krajac | 74—572 |
| 3,424,026 | 1/1969 | Vaughn | 74—572 |
| 3,302,307 | 2/1967 | Haden | 46—47 X |

FOREIGN PATENTS

| | | |
|---|---|---|
| 400,333 | 10/1933 | Great Britain. |

MILTON, Kaufman, Primary Examiner